United States Patent [19]

Kirch

[11] Patent Number: 4,838,359

[45] Date of Patent: Jun. 13, 1989

[54] SOIL WORKING MACHINE HAVING A ROTOR DRIVEN AROUND AN OBLIQUE AXIS

[75] Inventor: Michel Kirch, Etting, France

[73] Assignee: Kuhn S. A., Saverne, France

[21] Appl. No.: 275,618

[22] Filed: Nov. 25, 1988

Related U.S. Application Data

[63] Continuation of Ser. No. 911,449, Sep. 25, 1986, abandoned.

[30] Foreign Application Priority Data

Sep. 25, 1985 [FR] France ................................ 85 14314

[51] Int. Cl.⁴ ............................................. A01B 33/02
[52] U.S. Cl. ..................................... 172/123; 172/124; 172/190
[58] Field of Search ............... 172/112, 113, 119, 124, 172/123, 118, 120, 548, 556, 68, 190

[56] References Cited

U.S. PATENT DOCUMENTS

| | | | |
|---|---|---|---|
| 1,051,624 | 1/1913 | Nilson | 172/123 X |
| 2,373,716 | 4/1945 | Soucie | 172/124 X |
| 2,754,743 | 7/1956 | Ryden | 172/190 X |
| 2,772,615 | 12/1956 | Smith | 172/190 X |
| 3,054,461 | 9/1962 | Maguire | 172/71 |
| 3,233,686 | 2/1966 | Steadman | 172/119 |
| 4,284,146 | 8/1981 | van der Lely | 172/119 |

FOREIGN PATENT DOCUMENTS

| | | | |
|---|---|---|---|
| 1965753 | 7/1970 | Fed. Rep. of Germany . | |
| 976450 | 10/1950 | France . | |
| 1224856 | 2/1960 | France | 172/124 |
| 1306526 | 9/1962 | France . | |
| 1501969 | 10/1969 | France . | |
| 2023376 | 8/1970 | France . | |
| 2148368 | 3/1973 | France . | |
| 442839 | 1/1968 | Switzerland | 172/47 |
| 789106 | 1/1958 | United Kingdom | 172/124 |
| 915903 | 1/1963 | United Kingdom | 172/124 |
| 934865 | 8/1963 | United Kingdom | 172/124 |

Primary Examiner—Richard J. Johnson
Attorney, Agent, or Firm—Oblon, Spivak, McClelland, Maier & Neustadt

[57] ABSTRACT

The farm machine includes a frame 9, a hitching structure 4, a rotor 16 supported by the frame 9, and spades 21 mounted on the rotor 16. The active parts of the spades 21 are curved. The curvature of all of the spades 21 is directed in the same direction and toward the forward end of the rotor 16, considering the work direction 3.

26 Claims, 4 Drawing Sheets

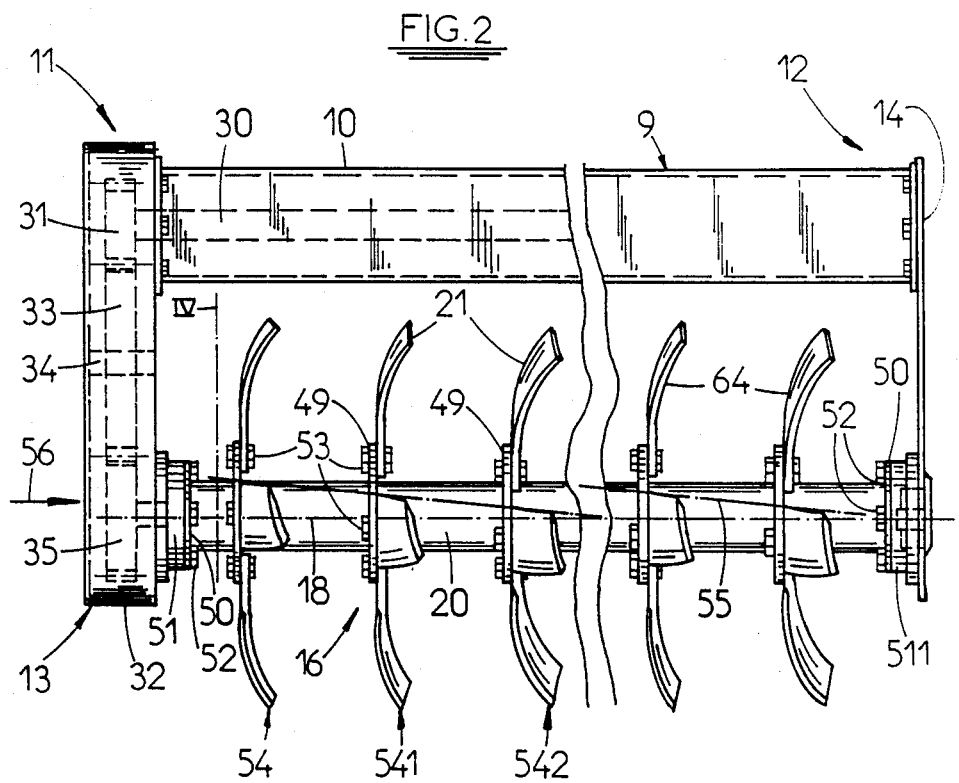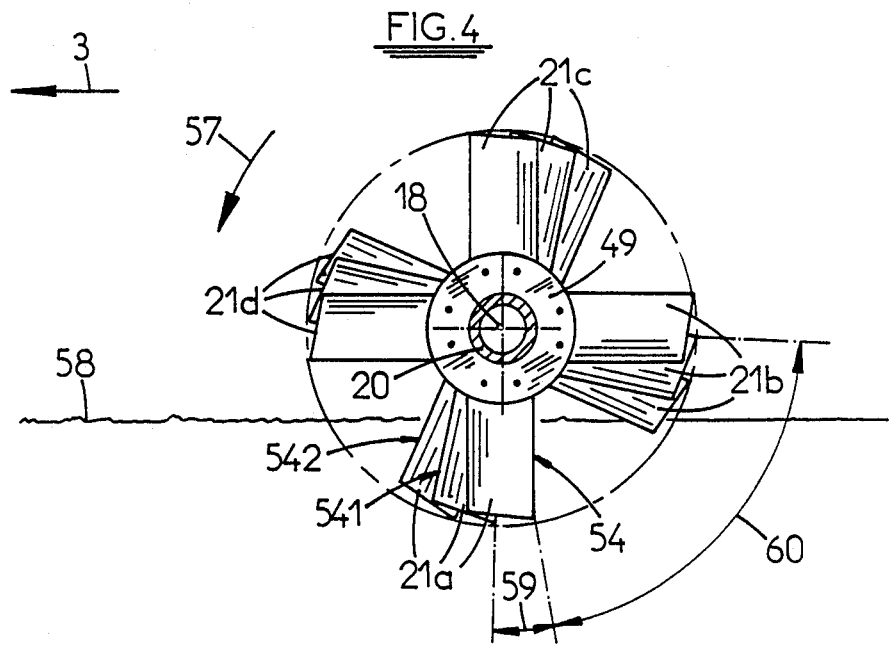

SOIL WORKING MACHINE HAVING A ROTOR DRIVEN AROUND AN OBLIQUE AXIS

This application is a Continuation of application Ser. No. 06/911,449, filed on September 25, 1986, now abandoned.

FIELD OF THE INVENTION

This invention relates to a farm machine having a rotor equipped with tools for working the soil. The rotor is driven positively by a driving source around a longitudinal axis that extends obliquely in relation to the direction of work of the machine. Accordingly, at the level of the ground, the tools move backwards, considering the work direction, and work strips of earth that are at least approximately contiguous.

BACKGROUND OF THE INVENTION

Machines of this general type are known having tools for working the soil consisting of disks having the shape of a spherical cap the edge of which is circular or ribbed. However, these known machines have several drawbacks.

A first drawback of the known machines resides in the fact that the smooth or ribbed disks cut the weeds, which causes them to proliferate. This proliferation is particularly significant in the case of couch grass. The elimination of this increased mass of weeds requires a very large volume of weed-killing products. This increases production costs and endangers the environment.

A second drawback of the disks equipping the known machines resides in the creation of a large plow sole which prevents or impedes the flow of water into the soil and the growth of the root system of plants. Moreover, in clayey soils, the disks cause a considerable smoothing of the clods, which is detrimental to their later breakup during the preparation of a seed bed. In addition, in clayey soils, the disks also have a tendency to clog very quickly. On the other hand, in loam soils, the disks cause a pulverization of the soil which promotes the formation of extremely hard harmful layers after precipitations.

A third drawback of the known machines resides in the fact that, in dry soils, the disks do not easily penetrate the soil, or even do not penetrate the soil at all.

A fourth drawback of the known machines relates to the obtaining of a poor mixture of straw and soil when plowing up the stubble of a field. This is mainly due to the fact that the disks have a relatively limited ability to throw the soil.

A fifth drawback of the known machines relates to the relatively rapid wear of the disks. Since the disks cut the soil, their thickness must necessarily be small, which brings about a rapid wear.

Object of the Invention

The object of this invention is to create a machine for working the soil of general type described at the outset which, however, does not suffer from the drawbacks of the known machines.

SUMMARY OF THE INVENTION

For this purpose, the machine according to this invention has tools which consist of spades the active parts of which are curved. The spades are arranged so that the curvature of the active parts of all the spades is directed in the same direction and toward the forward end of the rotor, considering the work direction of the machine.

General Discussion and Advantages of the Invention

With these characteristics, the machine according to the invention no longer has the drawbacks of the existing machines.

With the machine according to the invention, weeds are no longer cut, but are uprooted. Their proliferation is thus stopped.

As the spades, one after the other, attack the soil to be worked, there is no longer a formation of a plow sole. Moreover, this also makes it possible to obtain, in dry and hard soils, a good penetration because the discrete spades penetrate much more easily in the soil than do continuous disks. This effect of improved penetration is substantially accentuated by the fact that the spades are driven positively in rotation.

The speed of rotation of the rotor is not too important. The speed is nevertheless such that, at the level of the soil, the spades have a greater linear speed than they would have if they were driven only by the soil when the machine is moved in the work direction. This makes it possible to obtain a good turning over of the earth when the machine performs deep work, such as plowing. For shallower work (such as stubble-plowing, for example) the rotation speed of the rotor can be somewhat greater to obtain a better throw.

In clayey soils, smoothing of the clods is nonexistent. In loam soils, the machine makes it possible to form clods, but the machine does not pulverize the soil. Water can thus penetrate into the soil and thus does not cause the formation of hard layers.

For shallower work, such as stubble-plowing, the mixture of the straw and the soil is better than with the prior art machines because the spades uniformly throw the dug up clods backwards. In addition, with this machine it is possible under certain conditions to chop the straw during the stubble-plowing operation.

For deep work, such as plowing, the machine effectively turns over the dug up clods of earth.

The spades of the machine according to the invention are also less vulnerable to wear because their thickness can be greater. This follows from the fact that the spades must uproot clods of eart and not cut them out.

Advantageously, the speed of rotation of the rotor with spades can be regulated by a speed-box. The work speed can thus be perfectly adapted to the nature of the work to be performed.

The spades which equip the machine according to the invention advantageously have an active part which is curved in an at least approximately continuous manner. Preferably, this curvature is made along an at least approximately constant radius. This shape makes it possible for the spades to turn over the dug up soil well.

Advantageously, the active part of the spade is also twisted. This twisting is made so that the front edge of the active part of the spade, seen in the direction of rotation, is farther away from the most forward end of the rotor than the back edge of the active part. Preferably, the twisting of the active part is at least approximately continuous. The shape of the spade thus somewhat approaches that of a mold board. This twisting makes it possible to improve the turning over of the dug up soil.

This twisting also makes it possible to reduce (or even to eliminate entirely) the slip heel soil pressure of the spade when it rotates and the machine advances. This reduction or elimination of the slip heel soil pressure causes a decrease in the power necessary to drive the machine, as well as a reduction in the vibrations to which the machine is subjected during work.

The power consumption and the vibrations can also be reduced if the digging in of the outside edge of the active part of the spade is reduced or eliminated. For this purpose, the outside edge of the spade extends obliquely backward, considering the direction of rotation. Advantageously, the point of intersection of the outside edge and the front edge is farther from the longitudinal axis of the rotor than the point of intersection of the outside edge and the back edge.

A better digging up of the clods of earth is also obtained when the front edge of the active part of the spade is beveled. The beveling of the front edge of the active part of the spades also contributes to reducing the power consumption and to improving the penetration of the spades in extremely dry and hard soils.

The spades are also advantageously mounted on the rotor by groups, and each group of spades is angularly offset along the longitudinal axis of the rotor in relation to the adjacent groups of spades. Preferably, the helix thus formed extends continuously along the rotor. This characteristic makes it possible to reduce the points of power consumption and to make the operation of the machine smoother, because the corresponding spades of the various groups are successively engaged in the soil. This characteristic also makes it possible for a spade to turn over or throw correctly the earth that it has dug up without the spades of the group toward which its active part is curved interfering with the turnover or the throw.

The offsetting of the groups of spades is advantageously performed in such a way that, when a spade of one group is in the process of turning over or throwing the dug up earth, the spade of the adjacent group located forwardly of the group in question, which has just turned over or thrown the earth, is relatively far away from the spade of the first group which is in the process of working. Concurrently, the spade of the second group (which in turn will turn over or throw earth) is engaged in the soil only after the spade of the first group which is in the process of working.

As stated above, the machine makes it possible to work at various depths depending on the nature of the work to be performed. These working depths can be precisely determined by height-adjustable support means. Preferably, these support means are located in front of the rotor.

Since the rotor is inclined, a lateral thrust is produced during work which tends to bring the rotor into a position perpendicular to the direction of work. To counteract this thrust, the machine is equipped with lateral stabilization means, which are preferably located behind the rotor.

BRIEF DESCRIPTION OF THE DRAWINGS

Other characteristics and advantages of the invention will appear in the description below of an embodiment of the machine according to the invention. This description makes reference to the accompanying drawings, in which:

FIG. 2 is a view on a larger scale along the arrow 15 in FIG. 1.

FIG. 4 is a partial view of the rotor of the machine shown in FIG. 1, the rotor being cut by the plane IV and being seen along the arrow 56 in FIG. 2.

DETAILED DESCRIPTION OF THE PRESENTLY PREFERRED EMBODIMENT

Structure of the Preferred Embodiment

Figure 1:
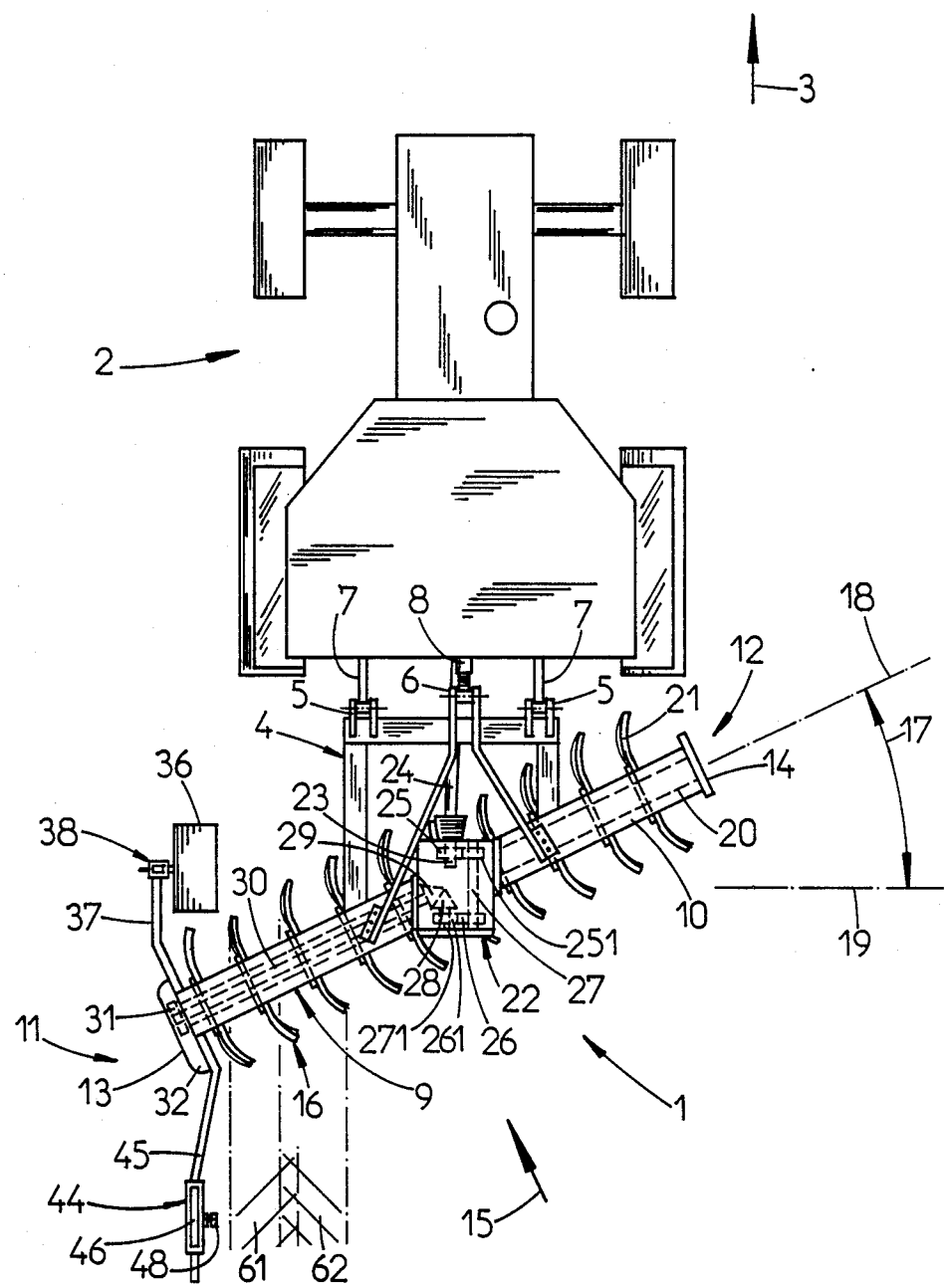
FIG. 1 is a top view of an embodiment of machine according to the invention hitched to a tractor.

In FIG. 1, a farm machine 1 for working the soil according to the invention is hitched to a farm tractor 2 which pulls it in the work direction 3. The farm machine 1 is equipped with a hitching structure 4 which has two lower hitching points 5 and an upper hitching point 6. The lower hitching points 5 are coupled to lower arms 7, and the upper hitching point 6 is coupled to a thrust rod 8 of the three-point hitching mechanism of the farm tractor 2.

The back part of the hitching structure 4 is fastened to a frame 9 of the farm machine 1. The frame 9 is composed of an upper cross piece 10 that has at each of its ends 11, 12 a side wall 13, 14 extending downwardly. Seen along an arrow 15, the frame 9 has an inverted U shape. Seen from above, the frame 9 extends obliquely in relation to the work direction 3, also so that its right end 12 is located more forwardly than its left end 11.

Between the lower ends of the side walls 13, 14 is placed a rotor 16 that extends parallel to the frame 9. That is, as seen from the back in the work direction 3, the right end of the rotor 16 is located more fordwardly than its left end. The longitudinal axis 18 of the rotor 16 makes an angle 17 with a perpendicular 19 to the work direction 3. The angle 17 is such that work zone 61 and 62 of two adjacent groups of spades 541, 542 are at least approximately contiguous, and preferably overlap. The angle 17 is preferably between 20° and 35°. In the embodiment described, the angle 17 is equal to about 26°.

The rotor 16 is composed of a central beam 20 on which tools for working the soil, in the form of spades 21, are fastened. The diameter of the rotor 16 is advantageously greater than 50 centimeters. Preferably, the diameter of the rotor 16 is between 60 and 90 centimeters. The spades 21 have their active parts 64 (see FIG. 2) curved. The curvature of all the spades 21 is directed toward the right end 12 of the rotor 16 (i.e., toward the end which extends most forwardly, considering the work direction 3).

During work, the rotor 16 is driven positively around its longitudinal axis 18. Accordingly, the spades 21 move at the level of the ground 58 from the front toward the back (see FIG. 4). For this purpose, the frame 9 has, approximately at the level of the longitudinal plane of symmetry of the farm tractor 2, a transmission housing 22 which is in the example a speed-box. The transmission housing 22 has an input shaft 23 which receives the movement of the power takeoff shaft of the farm tractor 2 by a transmission shaft 24 with universal joints.

At its back end, the input shaft 23 is equipped with a gear 25 which drives a gear 251 connected to a first intermediate shaft 27 extending at least approximately parallel to the input shaft 23. In the back, the first intermediate shaft 27 is equipped with a gear 26 which meshes with a gear 261 connected to a second intermediate shaft 271 that extends at least approximately parallel to the input shaft 23 and to the first intermediate shaft 27.

In the front, the second intermediate shaft 271 has a bevel gear 28 which meshes with another bevel gear 29. The bevel gear 29 is connected to a drive shaft 30 housed inside the upper cross piece 10 of the frame 9. The drive shaft 30 extends to the left end 11 of the frame 9, where the drive shaft 30 is equipped with a gear 31. The gear 31 is housed inside the left side wall 13, which is made in the form of a side housing 32.

The side housing 32 is shown in greater detail in FIG. 2. In FIG. 2, it is seen that the gear 31 meshes with a gear 33 keyed on a third intermediate shaft 34. The gear 33 meshes with a gear 35 connected to the rotor 16. The gears 26 and 261 can be (in a way known in the art) exchanged or replaced with differently sized gears. In this way, the speed of rotation of the rotor 16 can be perfectly adapted to the various work to be performed. The speed of rotation of the rotor 16 is preferably between 50 and 110 revolutions per minute for deep work, such as plowing, and between 100 and 200 revolutions per minute for shallow work, such a stubble-plowing.

Figure 3:
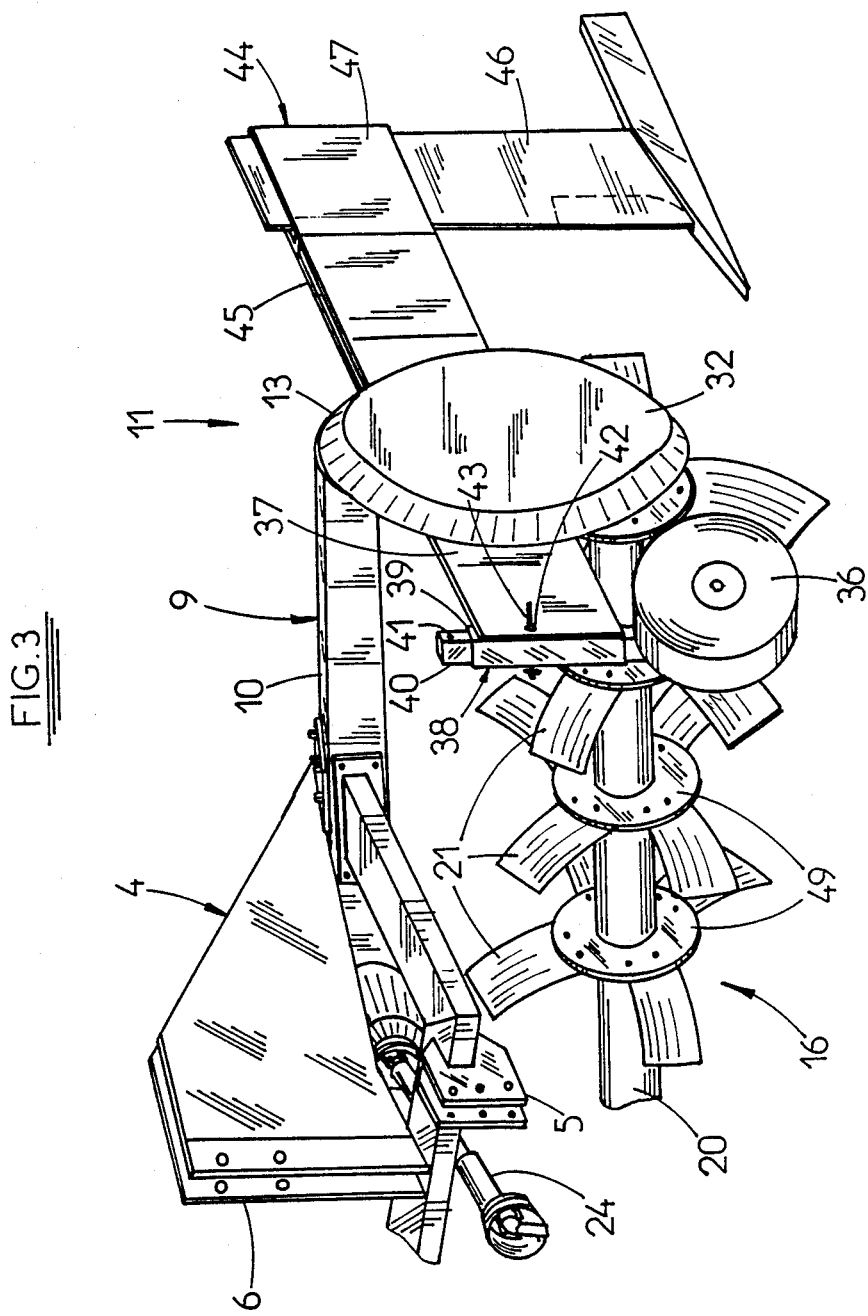
FIG. 3 is a view in perspective three-fourths before the left end of the machine shown in FIG. 1.

In FIG. 1, it is seen that in front of its left end 11, the frame 9 is equipped with a support wheel 36 that rolls over the soil during work. The support wheel 36 is connected to the frame 9 by a support structure 37 so that the vertical position of the support wheel 36 in relation to the frame 9 can be regulated by a regulating mechanism 38 which is shown in greater detail in FIG. 3.

The regulating mechanism 38, in the example described, includes a tubular sleeve 39 fastened to the support structure 37. A tenon 40 connected to the support wheel 36 is engaged in the tubular sleeve 39. Preferably, the tenon 40 and the tubular sleeve 39 are shaped so that the tenon 40 is connected in rotation to the tubular sleeve 39 when it is engaged in the tubular sleeve 39. The tenon 40 is equipped with holes 41 which can be brought into coincidence with a hole 42 made in the tubular sleeve 39 and going all the way through it. The connection in translation between the tenon 40 and the tubular sleeve 39 is achieved by a pin 43 which goes through one of the holes 41 in the tenon 40 and the hole 42 in the tubular sleeve 39. To bring the support wheel 36 into another position in relation to the frame 9, it is enough to bring another hole 41 in the tenon 40 opposite the hole 42 in the tubular sleeve 39 and to lock it in position with the pin 43. Thanks to the support wheel 36, it is thus possible to regulate the working depth of the farm machine 1.

Within the framework of the invention, it is possible also to have a support wheel 36 at the right end 12 of the frame 9. Moreover, the regulating mechanism 38 can be different from the one shown. It can, for example, comprise a screw-crank and a nut. In the latter case, the working depth of the spades 21 can be regulated continuously, rather than discretely.

At the back of the left end 11 of the frame 9 is fastened a lateral stabilization element 44. The lateral stabilization element 44 is connected to the frame 9 by a support structure 45. The lateral stabilization element 44, in the example described, includes a chisel share 46 which is engaged in the soil during work. The chisel share 46 is mounted on the support structure 45 by a sleeve 47 (see FIG. 3). The relative position of the chisel share 46 in relation to the frame 9 can be regulated by causing the chisel share 46 to slide inside the sleeve 47 after having loosened a holding bolt 48 (see FIG. 1) which prevents the translation of the chisel share 46 in the sleeve 47 when it is tightened.

Within the framework of the invention, the lateral stabilization element 44 can be different from the chisel share 46 shown. For example, it can consist of a rotary flange revolving in a non-horizontal plane, preferably at least approximately vertical and at least approximately parallel to the direction of advance 3.

The lateral stabilization element 44 absorbs the crosswise force which is exerted on the rotor 16 during work and which is produced by the inclination of the rotor 16.

Also within the framework of the invention, the machine can be built so that it has two rotors 16 arranged in a V. In this case, the crosswise force produced by one of the rotors is at least approximately cancelled by the crosswise force produced by the other rotor.

In FIG. 2, the rotor 16 is seen in a more detailed manner. The central beam 20 is made of a tube on which flanges 49 are fastened at regularly spaced intervals. At each end, the central beam 20 is equipped with a fastening and drive flange 50. The fastening and drive flanges 50 make it possible to fasten the rotor 16 to hubs 51, 511 by means of bolts 52. The hubs 51, 511 are guided in rotation in the side walls 13, 14.

The hub 51 that is guided in rotation in the left side wall 13 (i.e., in the side housing 32) is connected to the gear 35. The gear 35 transmits to the hub 51 the movement from the power takeoff of the farm tractor 2 as explained above.

The flanges 49 are used to fasten the spades 21 to the central beam 20. This fastening is done by means of bolts 53. The particular shape of the spades 21 will be described below. The spades 21 are fastened to the rotor 16 in groups 54, 541, 542, etc. The flanges 49 are placed on the central beam 20 so that each group 54, 541, 542, etc. of the spades 21 is angularly offset around the longitudinal axis 18 of the rotor 16 in relation to the adjacent groups of spades. Corresponding spades 21 of each group of spades 54, 541, 542, etc. thus produce a continuous helix 55 which is centered on the longitudinal axis 18 of the rotor 16. This arrangement appears clearly in FIG. 4, which is a view of the rotor 16 along the arrow 56 in FIG. 2.

In FIG. 4, the direction of rotation 57 of the rotor 16 and its work direction 3 have been specified. For a good understanding of the figure, only three consecutive groups of spades 54, 541, 542, have been shown. In this figure, it is also seen that, in the embodiment described of a machine according to the invention, the active part 64 (see FIGS. 5-7) of the spades 21 of the same group 54, 541, 542, etc. are not contiguous.

It also appears from FIG. 4 that corresponding spades 21a, 21b, 21c, 21d of the various groups of spades 54, 541, 542, etc. attack the soil 58 one after the other, the spades 21 of the group 54 located at the left end 11 the farm machine 1 attacking the soil 58 first. Each group of spades 541, 542, etc. is thus offset in relation to the proceding adjacent group, 54, 541, etc. by an angle 59. The angle 59 is selected so that an angle 60 formed between a spade 21a for example of group 54, 541 and a preceding spade 21b of the following adjacent group 541, 542 is sufficient for the spade 21b not to interfere with the turning over or throw of the earth dug up by the spade 21a of the preceding group. Advantageously, the value of the angle 59 is different from the value of the angle 60. This arrangement is especially important for deep work, where the dug up clods have a large volume.

Figure 5:
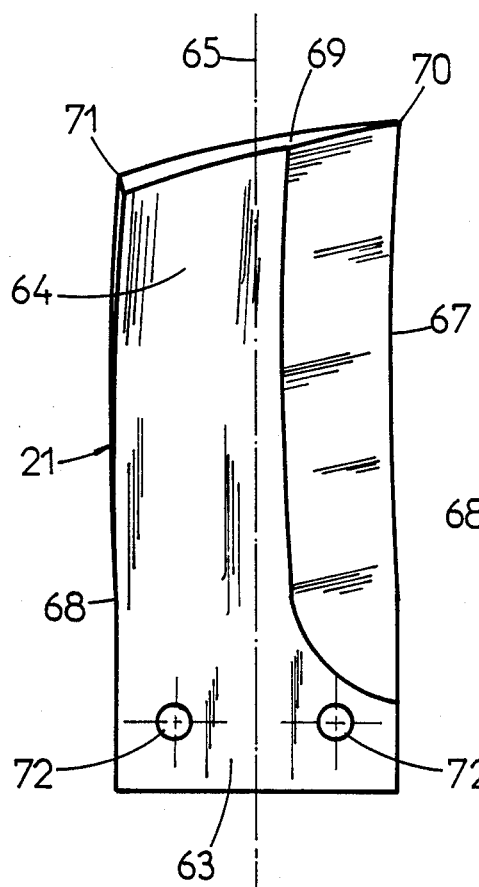
FIG. 5 shows a spade of the rotor in front view.
Figure 6:
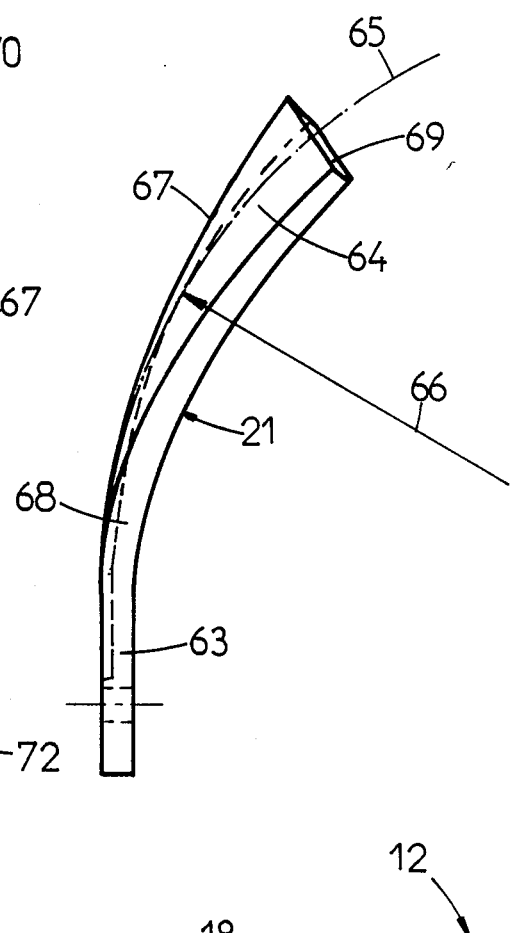
FIG. 6 shows the spade of FIG. 5 seen from the left side.
Figure 7:
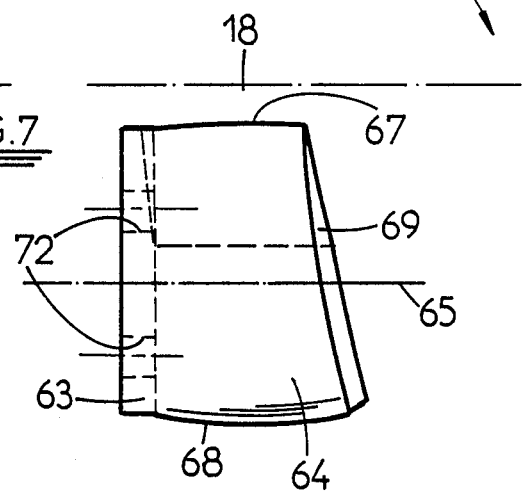
FIG. 7 shows the spade of FIG. 5 seen from above.

FIGS. 5-7 show the shape of spades 21. The spades 21 have a fastening part 63 that is approximately planar and an active part 64 that is curved. In the embodiment described, the curvature is made at least approximately continuously all along the active part 64. Preferably, the longitudinal axis 65 of the spade 21 is curved along an at least approximately constant radius of curvature 66. The radius of curvature 66 is preferably between 0.3 and 0.5 times the diameter of the rotor 16.

The active part 64 is preferably twisted so that the front edge 67 (the spade 21 being seen in the direction of rotation 57) is farther away from the forward (right) end 12 of the rotor 16 than the back edge 68 of the active part 64. Preferably, the twisting of the active part 64 is performed at least approximately continuously. Advantageously, the twisting can be performed around an axis at least approximately parallel to the longitudinal axis 65 of the active part 64. In the example described, the twisting is performed around the longitudinal axis 65. Advantageously, the value of the twisting is, at the level of the outside edge 69 of the spade 21, on the order of 5° to 15° and preferably about 10°.

The outside edge 69 of the active part 64 extends obliquely toward the back so that the intersection point 70 of the outside edge 69 and the front edge 67 is farther away from the longitudinal axis 18 of the rotor 16 than the intersection point 71 of the outside edge 69 and the back edge 68. To assure a better penetration into the soil, the front edge 67 is additionally beveled.

Moreover, the active part 64 of the spade 21 has a rather considerable width, which makes it possible to grab well the dug up clods of earth to turn them over and/or to throw them.

In FIGS. 5-7 it is also seen that the fastening part 63 of the spade 21 is provided with two fastening holes 72 through which pass the bolts 53 that make it possible to fasten the spades 21 to the flanges 49.

Operation of the Preferred Embodiment

The machine according to the invention operates in the following manner.

During work, the farm machine 1 is hitched to the farm tractor 2, which pulls the farm machine 1 in the work direction 3. Simultaneously, the power takeoff of the farm tractor 2 drives the rotor 16 in rotation in the direction of rotation 57. By rotating, each spade 21 digs up clods of earth.

Since the longitudinal axis 18 of the rotor 16 extends obliquely in relation to the work direction 3, the spades 21 impart to the dug up clods a movement which is directed crosswise to the work direction 3.

Because each spade 21 has a curved and twisted active part 64, the spades 21 also force the dug up clods of earth to be turned over, thereby burying the stubble. Moreover, since the curvature and the twisting are at least approximately continuous, the sliding of the dug up clods along the surfaces of the active part 64 of the spades 21 is very regular.

Since the machine according to the invention is driven in rotation positively by a driving source, it is capable of working in very varied soils. In addition, the quality of the work provided is relatively constant.

Depending on the work to be done, the rotation speed of the rotor 16 and the working depth of the spades 21 can be regulated. The regulating of the rotation speed of the rotor 16 is performed by modifying the output speed of the transmission housing 22, while the working depth is regulated by the regulating mechanism 38 of the support wheel 36.

For deep work, where it is desired to have rather large clods, the rotation speed of the rotor 16 should not be very high. This makes it possible for the spades 21 to dig up clods of a certain size and to turn them over well without throwing them, because this would cause them to break.

For shallower work, such as stubble-plowing, where it is desired to obtain a good mixture of the earth with the stubble, the rotation speed of the rotor 16 can be higher. This makes it possible for the spades 21 to dig up finer clods and throw them with the stubble, which makes it possible to obtain the desired good mixture.

Under certain conditions, it is possible, as indicated above, to chop the straw which is on the field and to mix it well with the earth. The machine according to the invention thus makes it possible under certain conditions to eliminate a preliminary chopping operation of the straw brfore plowing under.

In addition to their function of facilitating the turning over and/or the throwing of the dug up clods, the curvature and twisting of the active part 64 of the spades 21, as well as the setting back of the outside edges 69 of the active part 64, make it possible for the spades 21 not to trail over the nonworked soil. This makes it possible to reduce substantially the vibrations and the power consumption of the machine.

The vibrations are also reduced by the fact that the spades 21 extend along a helix along the rotor 16. The spades 21 thus successively penetrate into the soil. The curve of power consumed by the machine is thus more regular.

Various modifications or improvements can be made to the embodiment which has been described without thereby going outside the scope of the invention. In particular, it will be possible, within the scope of the invention, to produce a machine which is more specially suited to deep work, as well as a machine which is more specially suited to shallow work.

What is Claimed as new and desired to be secured by Letters Patent of the United States is:

1. A farm machine for working the soil, said farm machine comprising:
   (a) a frame comprising an upper structure at each end of which there is a downwardly extending side structure having each a lower end;
   (b) a hitching structure attached to said frame and by which said farm machine is hitched, during use, to a pulling source;
   (c) a rotor rotatably supported between said lower ends of said side structures, said rotor being equipped with soil working means and having a longitudinal axis which extends obliquely in relation to a work direction of the machine, said rotor having a forward end and a rearward end considering said work direction, adjacent soil working means working, during use, strips of soil that are very close to each other, that are continuous to each other, or that only slightly overlap each other, said soil working means each comprising a group of spades each one of which is mounted in a removable manner on said rotor, each group of spades is angularly offset around the longitudinal axis of said rotor in relation to the adjacent group of spades, the angular offset between adjacent groups of spades is at least approximately constant along said rotor, each one of said spades having an active part which is curved, the curvature of the active part of all of said spades being directed in the same direction and towards said forward end of said rotor;

(d) lateral stabilization means which comprise at least one chisel share;

(e) height-adjustable support means connected to said frame and by which the working depth of said soil working means is regulated; and (f) transmission means coupled, during use, to a driving source for positively driving said rotor around its longitudinal axis so that said soil working means are moving forward at their highest positions.

2. A farm machine for working the soil according to claim 1 wherein said transmission means comprise a housing containing a transmission by means of which the rotation speed of said rotor can be regulated.

3. A farm machine for working the soil according to claim 2 wherein, for deep work, said rotor rotates at a speed between 50 and 110 revolutions per minute and, for shallow work, said rotor rotates at a speed between 100 and 200 revolutions per minute.

4. A farm machine for working the soil according to claim 1 wherein the longitudinal axis of said rotor makes an angle of between 20° and 35° with a perpendicular to the work direction.

5. A farm machine for working the soil according to claim 4 wherein said angle is at least approximately 26°.

6. A farm machine for working the soil according to claim 1 wherein the diameter of said rotor is greater than or equal to 50 centimeters.

7. A farm machine for working the soil according to claim 6 wherein the diameter of said rotor is between 60 centimeters and 90 centimeters.

8. A farm machine for working the soil according to claim 1 wherein each one of said spades has an at least approximately continuously curved active part.

9. A farm machine for working the soil according to claim 8 wherein the active part of each one of said spades is curved along an at least approximately constant radius of curvature.

10. A farm machine for working the soil according to claim 9 wherein the value of the radius of curvature of the active part of each one of said spades is between 0.3 and 0.5 times the diameter of said rotor.

11. A farm machine for working the soil according to claim 8 wherein:

(a) the active part of each one of said spades has a longitudinal axis and (b) said longitudinal axis is curved along an at least approximately constant radius of curvature.

12. A farm machine for working the soil according to claim 11 wherein the value of the radius of curvature of the longitudinal axis of the active part of each one of said spades is between 0.3 and 0.5 times the diameter of said rotor.

13. A farm machine for working the soil according to claim 1 wherein:

(a) the active part of each one of said spades has, seen in the direction of rotation, a front edge and a back edge and (b) the active part of each one of said spades is twisted so that said front edge is farther away from the forward end of said rotor than said back edge.

14. A farm machine for working the soil according to claim 13 wherein the active part of each one of said spades is twisted at least approximately continuously.

15. A farm machine for working the soil according to claim 13 wherein:

(a) the active part of each one of said spades has a longitudinal axis and (b) the active part of each one of said spades is twisted around an axis parallel to its longitudinal axis.

16. A farm machine for working the soil according to claim 15 wherein the active part of each one of said spades is twisted around its longitudinal axis.

17. A farm machine for working the soil according to claim 13 wherein:

(a) the active part of each one of said spades has an outside edge and (b) the twisting of said active part has, at the level of said outside edge, a value of between 5° and 15°.

18. A farm machine for working the soil according to claim 17 wherein the twisting of the active part of each one of said spades has, at the level of the outside edge, a value at least approximately equal to 10°.

19. A farm machine for working the soil according to claim 1 wherein:

(a) the active part of each one of said spades has an outside edge and (b) said outside edge extends obliquely backwards.

20. A farm machine for working the soil according to claim 19 wherein:

(a) said active part of each one of said spades has, seen in the direction of rotation, a front edge and a back edge;

(b) said front edge and said outside edge define a first intersection point;

(c) said back edge and said outside edge define a secone intersection point; and (d) said first intersection point is farther away from the longitudinal axis of said rotor than said second intersection point.

21. A farm machine for working the soil accroding to claim 1 wherein:

(a) said active part of each one of said spades has, seen in the direction of rotation, a front edge and (b) said front edge is beveled.

22. A farm machine for working the soil according to claim 1 wherein the angular offset between adjacent groups of spades is such that the angle formed between two corresponding spades of said adjacent group is different from the angle formed between the spade of one of said adjacent groups and the preceding spade of the other one of said adjacent groups towards which is directed the curvature of the active part of said spade of said one of said adjacent groups.

23. A farm machine for working the soil according to claim 1 wherein said support means extends in front of said rotor.

24. A farm machine for working the soil according to claim 1 wherein said support means comprise at least one wheel.

25. A farm machine for working the soil according to claim 1 wherein said lateral stabilization means extend back of said rotor.

26. A farm machine for working the soil according to claim 25 wherein said lateral stabilization means comprise at least one chisel share extending behind the rearward end of said rotor.

* * * * *